(12) United States Patent
Niitsuma et al.

(10) Patent No.: US 11,102,966 B2
(45) Date of Patent: Aug. 31, 2021

(54) DUAL-BEARING REEL

(71) Applicant: Shimano Inc., Osaka (JP)

(72) Inventors: Motohiro Niitsuma, Osaka (JP); Hiroki Oogose, Osaka (JP)

(73) Assignee: Shimano Inc., Osaka (JP)

( * ) Notice: Subject to any disclaimer, the term of this patent is extended or adjusted under 35 U.S.C. 154(b) by 62 days.

(21) Appl. No.: 16/711,960

(22) Filed: Dec. 12, 2019

(65) Prior Publication Data

US 2020/0221678 A1 Jul. 16, 2020

(30) Foreign Application Priority Data

Jan. 10, 2019 (JP) ............................. JP2019-002990
Feb. 13, 2019 (JP) ............................. JP2019-023668

(51) Int. Cl.
*A01K 89/01* (2006.01)
(52) U.S. Cl.
CPC ............................ *A01K 89/01121* (2015.05)
(58) Field of Classification Search
CPC ..................... A01K 89/0192; A01K 89/01121
USPC ................................................. D22/140–142
See application file for complete search history.

(56) References Cited

U.S. PATENT DOCUMENTS

| 4,821,978 | A | | 4/1989 | Kaneko | |
|---|---|---|---|---|---|
| 4,934,628 | A | * | 6/1990 | Yamaguchi | A01K 91/20 242/223 |
| 5,183,221 | A | | 2/1993 | Kawai et al. | |
| D366,690 | S | * | 1/1996 | Storz | D22/140 |
| 5,829,701 | A | | 11/1998 | Murayama et al. | |
| 5,988,548 | A | * | 11/1999 | Chapman | A01K 89/015 242/310 |
| 6,016,982 | A | * | 1/2000 | Asano | A01K 89/0192 242/310 |
| D497,403 | S | * | 10/2004 | Asano | D22/140 |
| D724,173 | S | * | 3/2015 | Asaba | D22/140 |
| 8,985,493 | B2 | | 3/2015 | Niitsuma et al. | |
| 9,210,922 | B2 | | 12/2015 | Nakagawa et al. | |
| 2009/0194626 | A1 | * | 8/2009 | Gray | A01K 89/01903 242/249 |
| 2013/0087647 | A1 | * | 4/2013 | Niitsuma | A01K 89/0192 242/223 |
| 2017/0303520 | A1 | * | 10/2017 | Hyun | A01K 89/0182 |

FOREIGN PATENT DOCUMENTS

JP 3325174 B2 9/2002

* cited by examiner

*Primary Examiner* — Emmanuel M Marcelo
(74) *Attorney, Agent, or Firm* — Global IP Counselors, LLP

(57) ABSTRACT

A dual-bearing reel for casting a fishing line in a forward direction includes a first side plate on a first side, a second side plate on a second side, a rod mounting portion, a front cover and a handle. The second side plate is apart from the first side plate in a lateral direction so as to form a space therebetween. The rod mounting portion is disposed between the first side plate and the second side plate. The front cover has a distal end portion, and covers the space between the first side plate and the second side plate from a front. The handle disposed on the first side. The center of the distal end portion of the front cover in the lateral direction is positioned toward the first side relative to a center of the rod mounting portion in the lateral direction.

3 Claims, 5 Drawing Sheets

DUAL-BEARING REEL

CROSS-REFERENCE TO RELATED APPLICATIONS

This application claims priority to Japanese Patent Application No. 2019-002990, filed on Jan. 10, 2019 and Japanese Patent Application No. 2019-023668, filed on Feb. 13, 2019. The entire disclosures of Japanese Patent Application No. 2019-002990 and Japanese Patent Application No. 2019-023668 are hereby incorporated herein by reference.

BACKGROUND

Field of the Invention

The present invention relates to a fishing reel. In particular, the present invention relates to a dual-bearing reel.

Background Art

When fishing, palming is generally referred to when holding the reel body of a dual-bearing reel together with the fishing rod with one hand opposite the hand that operates the handle of the dual-bearing reel. For example, when the dual-bearing reel of Japanese Patent No. 3325174 is palmed, the reel body is held together with the fishing rod by extension of the index finger of the palming hand from below the reel body toward the handle side.

In recent years, dual-bearing reels have become increasingly compact. When a compact dual-bearing reel is palmed by extending the index finger of the palming hand from below the reel body toward the handle side, when using a conventional reel, the index finger of the palming hand remains unused, which tends to make palming less effective and unstable. In addition, since the reel body of a conventional dual-bearing reel cannot be supported to oppose the force with which the reel body is pulled forward during palming, a large load is applied to the rod mounting portion of the reel body that is attached to the fishing rod.

SUMMARY

An object of the present invention is to provide a dual-bearing reel in which it is possible to support the reel body to oppose the force with which the reel body is pulled forward during palming.

A dual-bearing reel according to one aspect of the present invention is capable of casting a fishing line in a forward direction and comprises a reel body and a handle. The reel body includes a first side plate, a second side plate disposed spaced apart from the first side plate in the left-right direction, a rod mounting portion disposed between the first side plate and the second side plate, and a front cover that covers the space between the first side plate and the second side plate from the front. The center of the distal end portion of the front cover in the left-right direction is positioned toward the first side plate side relative to the center of the rod mounting portion in the left-right direction.

In the dual-bearing reel, the center of the distal end portion of the front cover in the left-right direction is positioned toward the first side plate side relative to the center of the rod mounting portion in the left-right direction. That is, the center of the distal end portion of the front cover in the left-right direction is offset toward the handle side relative to the center of the rod mounting portion in the left-right direction. For this reason, for example, if palming is carried out by placing the index finger of the palming hand on the front cover, it is possible to hook the index finger of the palming hand, in the vicinity of the first joint of the index finger, onto the distal end portion of the front cover. As a result, it is possible to firmly support the reel body against the force with which the reel body is pulled forward during palming. In addition, since it is possible to prevent the index finger of the palming hand from remaining unused, the reel body can be firmly held together with the fishing rod.

Preferably, the reel body further includes a thumbrest disposed so as to cover at least a portion of the front cover from above. The thumbrest has a finger placement portion on which is placed the thumb of the hand that holds the reel body from the second side plate side. The finger placement portion corresponds to the distal end portion of the front cover. In this embodiment, when the thumb of the palming hand is placed on the finger placement portion, the reel body, together with the fishing rod, can be held more firmly.

Preferably, the finger placement portion is disposed in a position offset toward the first side plate side with respect to the center of the rod mounting portion in the left-right direction; in this embodiment, since the finger placement portion is disposed at a position close to the center of the distal end portion of the front cover, the holdability of the reel body during palming is improved.

Preferably, the finger placement portion has a shape that is depressed in a direction from above toward the front cover. In this embodiment, it is possible to hold the reel body stably with the thumb and the index finger of the palming hand.

Preferably, the reel body also has a second side cover that covers the side of the second side plate. The front cover has a first curved portion that is curved in an arc shape and extends from the distal end portion toward the first side plate, and a second curved portion that is curved in an arc shape, extends from the distal end portion toward the second side plate, and is smoothly connected to the second side cover. In this embodiment, the holdability of the reel body during palming can be improved by placing the index finger of the palming hand on the front cover.

According to the present invention, a dual-bearing reel is provided in which it is possible to support the reel body against the force with which the reel body is pulled forward during palming.

DETAILED DESCRIPTION OF EMBODIMENTS

Figure 1:
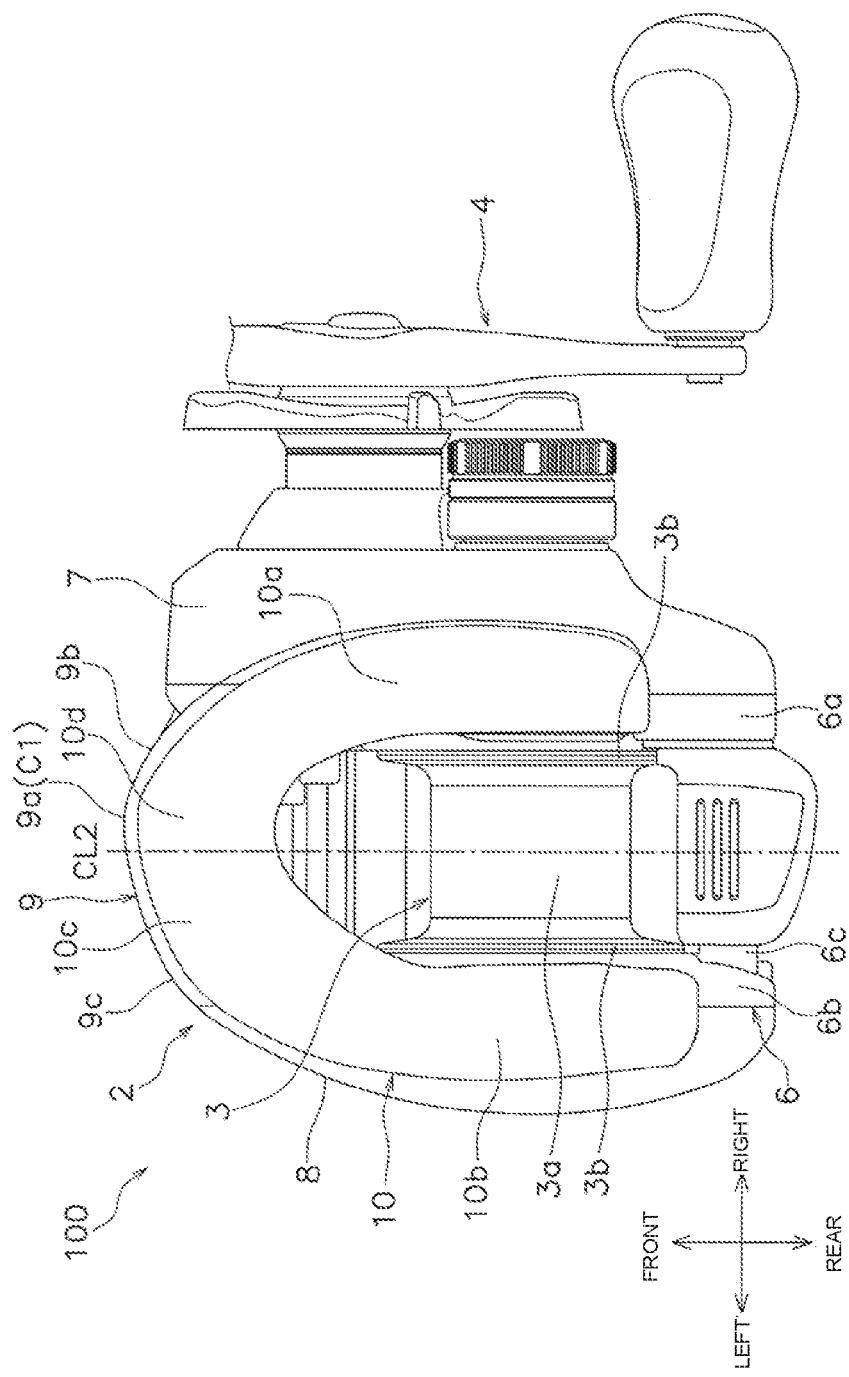
FIG. 1 is a plan view of a dual-bearing reel.
Figure 2:
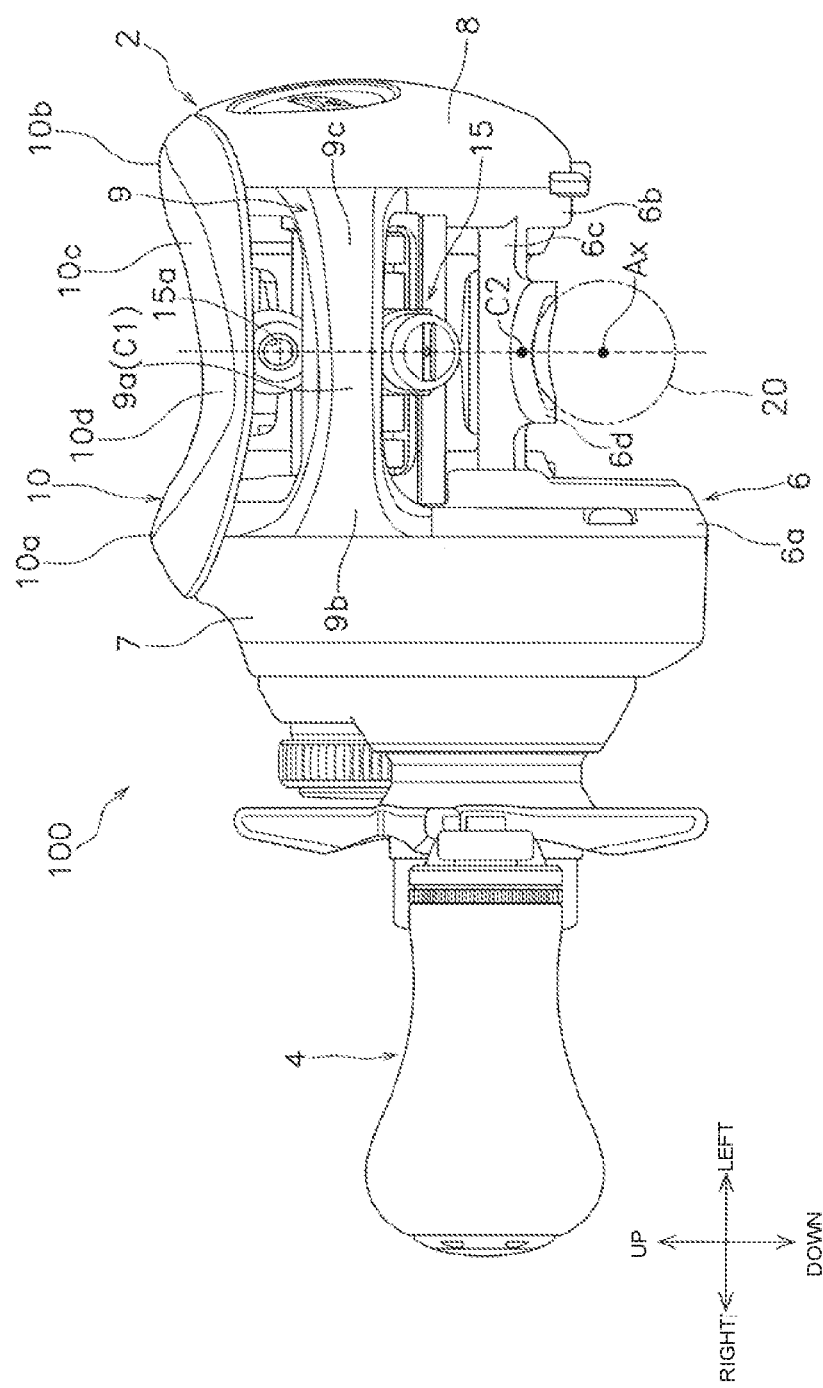
FIG. 2 is a front view of the dual-bearing reel.
Figure 3:
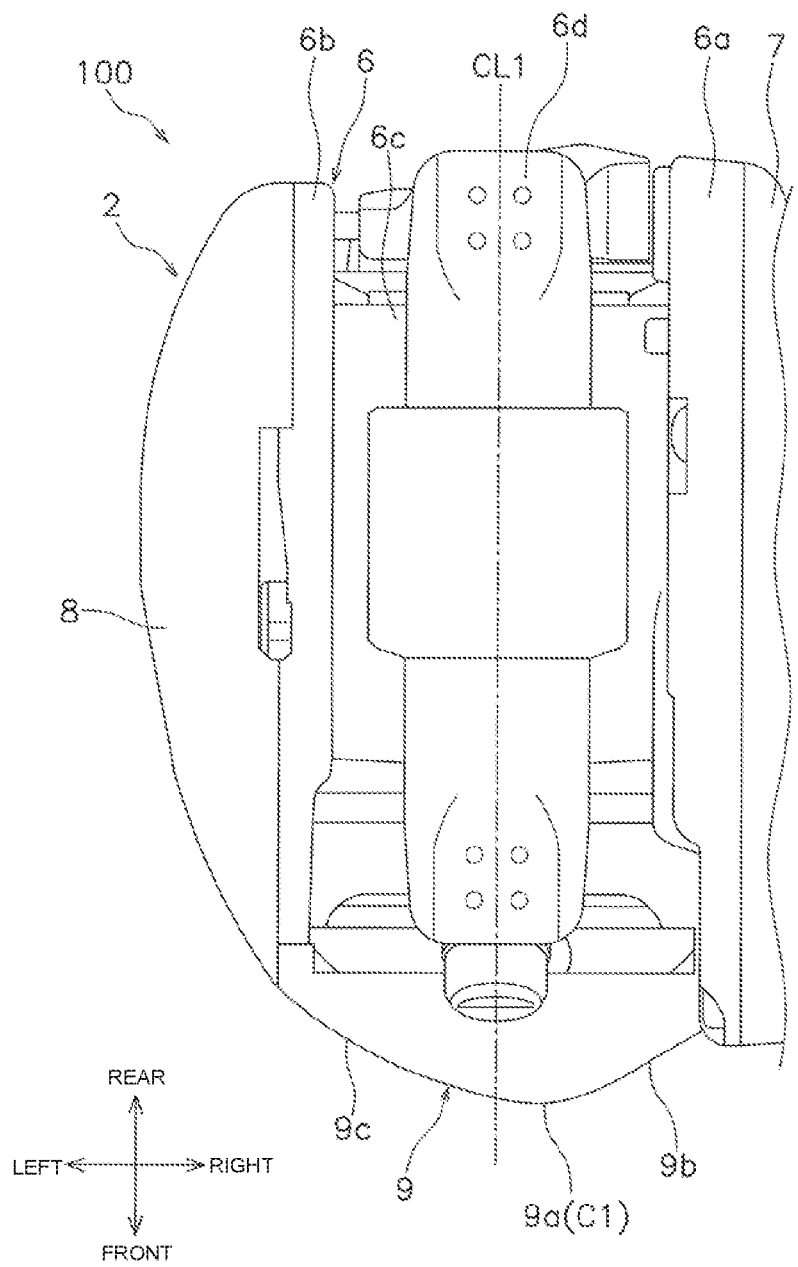
FIG. 3 is a partial bottom view of the dual-bearing reel.

FIG. 1 is a plan view of a dual-bearing reel 100 employing a first embodiment of the present invention. FIG. 2 is a front view of the dual-bearing reel 100. FIG. 3 is a partial bottom view of the dual-bearing reel 100. In the following description, the direction in which a fishing line is cast (unreeled) during fishing is referred to as the front, and the opposite direction is referred to as the rear. In addition, left and right refer to left and right when the dual-bearing reel 100 is viewed from the rear. In addition, the side of the dual-bearing reel 100 on which a fishing rod 20 is mounted (refer to FIG. 2) is referred to as "down" and the opposite side is referred to as "up."

The dual-bearing reel 100 is able to cast a fishing line in a forward direction. The dual-bearing reel 100 is, for example, a small dual-bearing reel used for bait casting. As shown in FIGS. 1 to 3, the dual-bearing reel 100 primarily comprises a reel body 2, a spool 3, and a handle 4.

The reel body 2 has a frame 6, a first side cover 7, a second side cover 8, and a front cover 9. In addition, preferably, the reel body 2 also has a thumbrest 10. The reel body 2 is configured to be of such size that the index finger of the palming hand can be placed on the front surface of the front cover 9.

The frame 6 has a first side plate 6a, a second side plate 6b, a plurality of connecting portions 6c, and a rod mounting portion 6d. The first side plate 6a is disposed on the right side of the frame 6. The second side plate 6b is disposed on the left side of the frame 6, spaced apart from the first side plate 6a in the left-right direction (or lateral direction). The plurality of connecting portions 6c extend in the left-right direction and connect the first side plate 6a and the second side plate 6b. The plurality of connecting portions 6c are integrally formed with the first side plate 6a and the second side plate 6b. The rod mounting portion 6d is disposed between the first side plate 6a and the second side plate 6b and extends below the frame 6 in the longitudinal direction. The rod mounting portion 6d is integrally formed with the plurality of connecting portions 6c. The fishing rod 20 is attached to the rod mounting portion 6d.

The first side cover 7 is disposed on the right side of the frame 6 and covers the right side of the first side plate 6a of the frame 6. The second side cover 8 is disposed on the left side of the frame 6 and covers the left side of the second side plate 6b of the frame 6.

The front cover 9 is disposed on the front side of the frame 6 and covers the space between the first side plate 6a and the second side plate 6b from the front. The front cover 9 is screwed and fixed to the frame 6. The front cover 9 is configured such that the index finger of the palming hand can be placed on the front surface of the front cover 9. In the present embodiment, as shown in FIGS. 1 to 3, the front cover 9 is shaped to project forward from the front side of the frame 6 in the form of an arc.

The front cover 9 has a distal end portion 9a, a first curved portion 9b, and a second curved portion 9c. In the present embodiment, the distal end portion 9a is the forwardmost positioned part of the front cover 9, and is positioned farther forward than the first side plate 6a and the second side plate 6b. The distal end portion 9a in the present embodiment is the portion where the first curved portion 9b and the second curved portion 9c intersect and a portion corresponding to the apex of the front cover 9 when the front cover 9 is viewed from the vertical direction. The index finger of the palming hand can make contact with the distal end portion 9a. As shown in FIG. 2, the front surface of the distal end portion 9a is smoothly connected to the first curved portion 9b and the second curved portion 9c. The distal end portion 9a can have a flat shape in the left-right direction, when the front cover 9 is viewed from the vertical direction.

The first curved portion 9b is arc-shaped and extends from the distal end portion 9a toward the first side plate 6a. The second curved portion 9c is arc-shaped and extends from the distal end portion 9a toward the second side plate 6b. The second curved portion 9c is smoothly connected to the second side cover 8. The curvature of the second curved portion 9c differs from the curvature of the first curved portion 9b. In the present embodiment, the curvature of the second curved portion 9c is less than the curvature of the first curved portion 9b.

As shown in FIGS. 2 and 3, the center C1 of the distal end portion 9a of the front cover 9 in the left-right direction is positioned toward the first side plate 6a side away from the center C2 of the rod mounting portion 6d in the left-right direction. That is, the center C1 of the distal end portion 9a of the front cover 9 in the left-right direction is positioned toward the handle 4 side relative to the center C2 of the rod mounting portion 6d in the left-right direction.

Specifically, the center C1 of the distal end portion 9a of the front cover 9 in the left-right direction is positioned toward the first side plate 6a side relative to the center line CL1 of the rod mounting portion 6d in the left-right direction. In the present embodiment, the center C1 of the distal end portion 9a of the front cover 9 in the left-right direction is a portion corresponding to the apex of the front cover 9 when viewed from the vertical direction. The center line CL1 is parallel to, and superposed in the vertical direction with, an axis Ax of the fishing rod 20. Accordingly, the center C1 of the distal end portion 9a of the front cover 9 in the left-right direction is positioned toward the first side plate 6a side relative to the axis Ax of the fishing rod 20.

Figure 4:
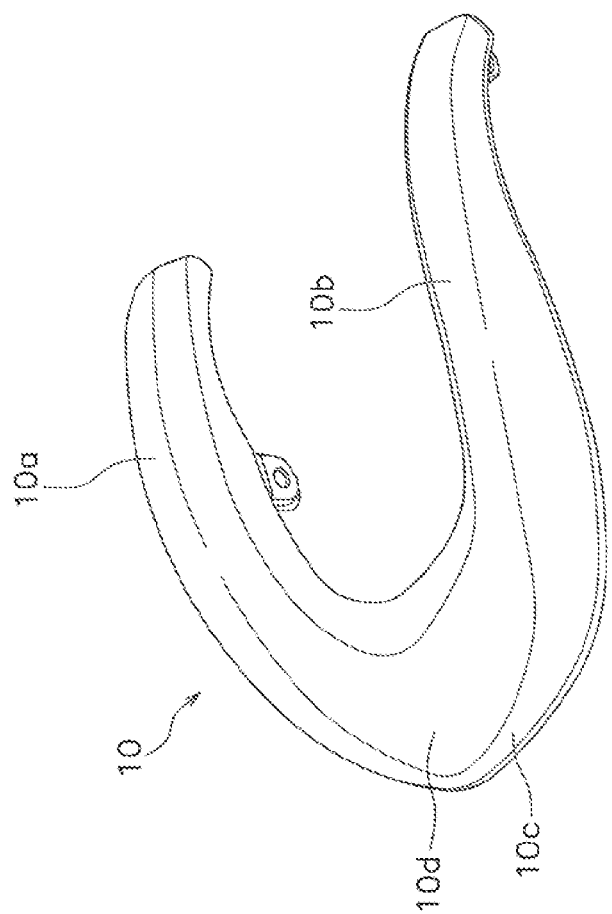
FIG. 4 is a perspective view of a thumbrest.

FIG. 4 is a perspective view of the thumbrest 10. As shown in FIGS. 1 and 4, the thumbrest 10 has a substantially U shape in a plan view, and is disposed so as to cover the upper portion of the frame 6. The thumbrest 10 is screwed and fixed to the frame 6. The thumbrest 10 may be integrally formed with the frame 6.

The thumbrest 10 has a first side thumbrest portion 10a, a second side thumbrest portion 10b, and a front thumbrest portion 10c. The first side thumbrest portion 10a covers the upper portion of the first side plate 6a. The second side thumbrest portion 10b covers the upper portion of the second side plate 6b. The front thumbrest portion 10c is disposed so as to cover at least a portion of the front cover 9 from above, and connects the first side thumbrest portion 10a and the second side thumbrest portion 10b. In the present embodiment, the front thumbrest portion 10c is disposed behind the distal end portion 9a of the front cover 9, and covers a portion of the front cover 9 from above. The front thumbrest portion 10c is disposed spaced apart from the front cover 9 in the vertical direction.

Preferably, the thumbrest 10 also has a finger placement portion 10d. The finger placement portion 10d is a place where the thumb of the hand holding the reel body 2 from the second side plate 6b side (refer to FIG. 5) is placed and is corresponds to the distal end portion 9a of the front cover 9. Specifically, the finger placement portion 10d is disposed in a position where the reel body 2 can be easily held when the vicinity of the first joint of the index finger of the palming hand is hooked onto the distal end portion 9a of the front cover 9.

The finger placement portion 10d is formed on the upper surface of the front thumbrest portion 10c and has a shape that is recessed in the direction from the upper part toward the front cover 9. The finger placement portion 10d is formed on the upper surface of the front thumbrest portion 10c so as to be inclined in a direction approaching the front cover 9 from the rear toward the front. As shown in FIG. 2, the finger placement portion 10d is disposed in a position offset toward the first side plate 6a side with respect to the center C2 of the rod mounting portion 6d in the left-right direction, and is disposed in a position close to the center C1 of the distal end portion 9a of the front cover 9.

The spool 3 is rotatably supported on the reel body 2 between the first side plate 6a and the second side plate 6b. The spool 3 has a bobbin trunk 3a and one pair of flange portions 3b. A fishing line is wound around the outer periphery of the bobbin trunk 3a. The two first flange portions 3b have larger diameters than the outer diameter of the bobbin trunk 3a at both ends of the bobbin trunk 3a.

As shown in FIG. 1, the center C1 of the distal end portion 9a of the front cover 9 in the left-right direction is positioned toward the first side plate 6a side relative to the center line CL2 of the bobbin trunk 3a in the left-right direction. In addition, the finger placement portion 10d is positioned with an offset toward the first side plate 6a side relative to the center line CL2 of the bobbin trunk 3a in the left-right direction. When viewed from the vertical direction, the center line CL2 of the bobbin trunk 3a in the left-right direction overlaps the axis Ax of the fishing rod 20 and the center line CL1 of the rod mounting portion 6d in the left-right direction.

As shown in FIG. 2, the dual-bearing reel 100 in the present embodiment comprises a reciprocating mechanism 15 for winding the fishing line uniformly around the bobbin trunk 3a of the spool 3. The reciprocating mechanism 15 has a guide hole 15a for guiding the fishing line. When the dual-bearing reel 100 is viewed from the front, the guide hole 15a is positioned between the front cover 9 and the thumbrest 10.

The handle 4 is provided on the reel body 2 so as to be rotatable on the first side plate 6a side. The rotation of the handle 4 is transmitted to the spool 3 via a well-known rotation transmission mechanism.

Figure 5:
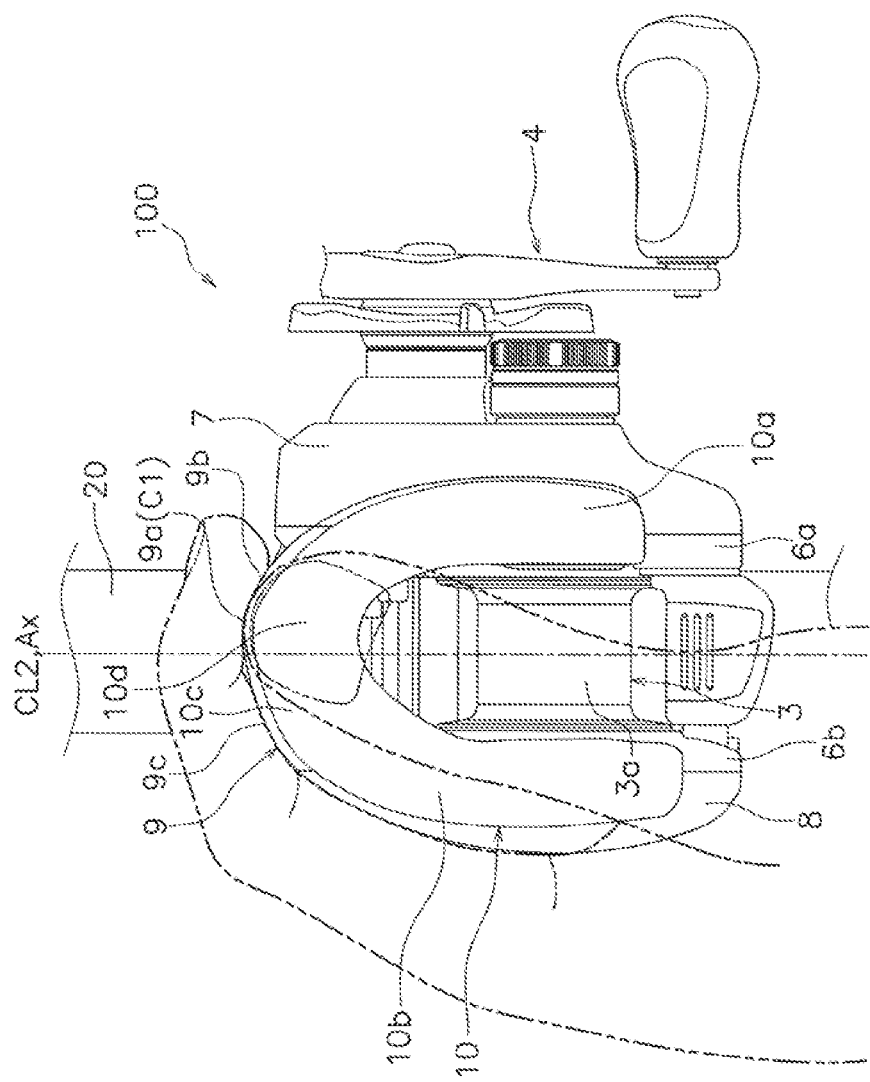
FIG. 5 is a view explaining positions of a thumb and an index finger when palming.

FIG. 5 is a view for explaining the positions of the thumb and the index finger during palming. In the present embodiment, since the handle 4 is disposed on the first side plate 6a side (right side), palming can be carried out with the left hand.

With respect to the dual-bearing reel configured as described above, it is possible to place the index finger of the palming hand on the front surface of the front cover 9, as shown in FIG. 5. Then, as described above, in the dual-bearing reel 100, the center C1 of the distal end portion 9a of the front cover 9 in the left-right direction is positioned toward the handle 4 side relative to the center C2 of the rod mounting portion 6d in the left-right direction. Therefore, as shown in FIG. 5, if palming is carried out by placing the index finger of the palming hand on the front surface of the front cover 9, it is possible to hook the index finger of the palming hand, in the vicinity of the first joint of the index finger, onto the distal end portion 9a of the front cover 9. As a result, it is possible to firmly support the reel body 2 to oppose the force with which the reel body 2 is pulled forward during palming. In addition, since it is possible to prevent the index finger of the palming hand from remaining unused, the reel body 2 can be firmly held together with the fishing rod 20.

In addition, in the dual-bearing reel 100, the finger placement portion 10d corresponds to the distal end portion 9a of the front cover 9. Specifically, the finger placement portion 10d is offset toward the first side plate 6a side with respect to the center C2 of the rod mounting portion 6d in the left-right direction. As a result, it is possible to hold the reel body 2 together with the fishing rod 20 more firmly and stably, with the thumb of the palming hand placed on the finger placement portion 10d. In addition, since the second curved portion 9c of the front cover 9 is smoothly connected to the second side cover 8, the index finger of the palming hand can be readily placed on the front cover 9 and the second side cover 8, thereby enhancing the holdability of the reel body 2.

OTHER EMBODIMENTS

One embodiment of the present invention is described above, but the present invention is not limited to the above-described embodiment, and various modifications can be made without departing from the scope of the invention. In particular, the various embodiments described in the present Specification may be combined in any manner deemed necessary.

In the present embodiment, the side plate arranged on the right side of the frame 6 is described as the first side plate 6a, and the side plate arranged on the left side of the frame 6 is described as the second side plate 6b, but the side plate arranged on the left side of the frame 6 may be the first side plate 6a, and the side plate arranged on the right side of the frame 6 may be the second side plate 6b. In this embodiment, the handle is arranged on the left side of the frame, and the center C1 of the distal end portion 9a of the front cover 9 in the left-right direction is positioned toward the first side plate 6a side (left side) relative to the center C2 of the rod mounting portion 6d in the left-right direction.

What is claimed is:

1. A dual-bearing reel for casting a fishing line in a forward direction, comprising:
    a first side plate on a first side of the dual-bearing reel;
    a second side plate disposed on a second side of the dual-bearing reel apart from the first side plate in a lateral direction so as to form a space therebetween;
    a rod mounting portion disposed between the first side plate and the second side plate;
    a front cover having a distal end portion, and covering the space between the first side plate and the second side plate from a front;
    a handle disposed on the first side; and
    a thumbrest having a finger placement portion on which a thumb of a hand of a user holding the reel body from the second side is capable of being placed, the thumbrest is disposed so as to cover at least a portion of the front cover when viewed from above, and the finger placement portion corresponds to the distal end portion of the front cover and is recessed in a direction toward the front cover; and
    a center of the distal end portion of the front cover in the lateral direction positioned toward the first side relative to a center of the rod mounting portion in the lateral direction.

2. The dual-bearing reel according to claim 1, wherein the finger placement portion is disposed in a position offset toward the first side relative to the center of the rod mounting portion in the lateral direction.

3. The dual-bearing reel according to claim 1, wherein the reel body further has a second side cover covering a side of the second side plate, and the front cover has a first curved portion that is arc-shaped and extends from the distal end portion toward the first side plate, and a second curved portion that is arc-shaped and extends from the distal end portion toward the second side plate and is smoothly connected to the second side cover.

* * * * *